(12) United States Patent
Shinkai

(10) Patent No.: US 7,587,397 B2
(45) Date of Patent: Sep. 8, 2009

(54) DISTRIBUTED TRANSACTION PROCESSING CONTROL

(75) Inventor: Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 11/150,109

(22) Filed: Jun. 13, 2005

(65) Prior Publication Data

US 2005/0228834 A1   Oct. 13, 2005

Related U.S. Application Data

(63) Continuation of application No. PCT/JP02/13250, filed on Dec. 18, 2002.

(51) Int. Cl.
*G06F 17/30* (2006.01)
(52) U.S. Cl. .......................................................... 707/8
(58) Field of Classification Search .................... 707/8, 707/200–205; 709/203, 224; 714/4, 13, 714/25; 370/216; 398/1
See application file for complete search history.

(56) References Cited

U.S. PATENT DOCUMENTS

| | | | | |
|---|---|---|---|---|
| 6,023,507 | A | * | 2/2000 | Wookey ..................... 709/224 |
| 6,085,244 | A | * | 7/2000 | Wookey ..................... 709/224 |
| 6,092,084 | A | | 7/2000 | Clark et al. |
| 6,490,595 | B1 | | 12/2002 | Candee et al. |
| 7,206,805 | B1 | * | 4/2007 | McLaughlin, Jr. .......... 709/203 |
| 7,272,649 | B1 | * | 9/2007 | Shively et al. .............. 709/225 |
| 2002/0001307 | A1 | * | 1/2002 | Nguyen et al. .............. 370/386 |
| 2002/0016827 | A1 | * | 2/2002 | McCabe et al. ............. 709/213 |
| 2005/0204214 | A1 | * | 9/2005 | Welch ........................ 714/712 |
| 2006/0101081 | A1 | * | 5/2006 | Lin et al. .................... 707/200 |
| 2007/0061383 | A1 | * | 3/2007 | Ozawa et al. ............... 707/202 |
| 2007/0174695 | A1 | * | 7/2007 | Varadarajan et al. ........... 714/15 |

FOREIGN PATENT DOCUMENTS

| | | |
|---|---|---|
| JP | 9-319634 | 12/1997 |
| JP | 10-289217 | 10/1998 |
| JP | 2001-306381 | 11/2001 |

OTHER PUBLICATIONS

Reddy, P. K. et al., "Reducing the blocking in two-phase commit protocol employing backup sites", Proceedings of $3^{rd}$ IFCIS International Conference on Cooperative Information Systems. 1998, pp. 406-415.

(Continued)

*Primary Examiner*—Diane Mizrahi
(74) *Attorney, Agent, or Firm*—Fujitsu Patent Center

(57) ABSTRACT

A distributed transaction processing system includes a master server (coordinator) and slave servers (participants). The master server and the slave servers create log file that indicates progress of a transaction. The log file is stored in a shared disk accessible from all the servers. When a fault occurs in the master server, the master server can continue a local transaction processing, which has been interrupted by the fault, after recovery from the fault by referring to the log file. When the fault occurs in any one of the slave servers, the master server can perform fault recovery of a transaction in which the faulty server is involved.

10 Claims, 9 Drawing Sheets

OTHER PUBLICATIONS http://www.sei.cmu.edu/str/descirptions/dptc.html, (Oct. 15, 2002).

Rachid Gucrraoui, et al., "Non Blocking Atomic Commitment with an Unreliable Failure Detector", Proceedings of the 14$^{th}$ symposium on Reliable Distributed Systems, 1995, pp. 41-50.

http://ei.cs.vt.edu/~williams/OS/ThreePhase.html.

http://www.seas.gwu.edu/~shumuel/cs251/3PC.html.

J.W. Stamos et al., "A Low-Cost Atomic Commit Protocol", 9$^{th}$ Symposium on Reliable Distributed Systems, IEEE, Oct. 9, 1990; pp. 66-75.

J. Gray et al., "Transaction Processing, Concepts and Techniques", Nikkei Business Publications, Inc., Oct. 29, 2001; pp. 673-688.

Office Action mailed on Jul. 29, 2008 and issued in corresponding Japanese Patent Application No. 2004-560585.

* cited by examiner

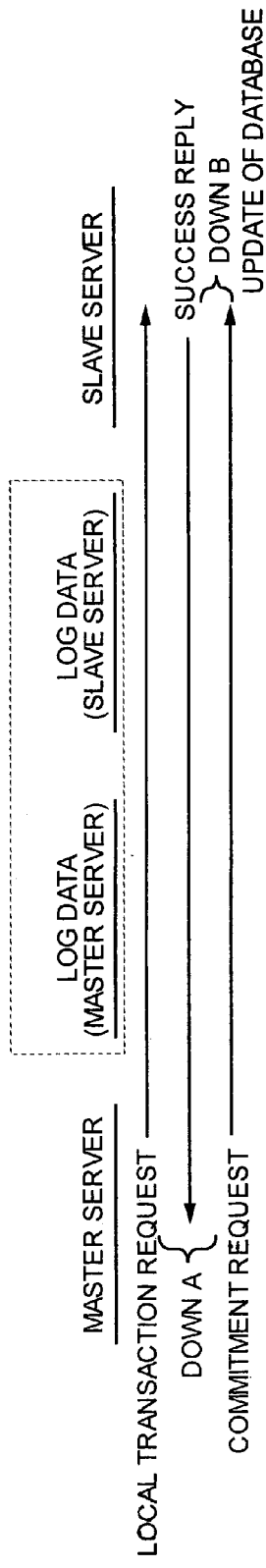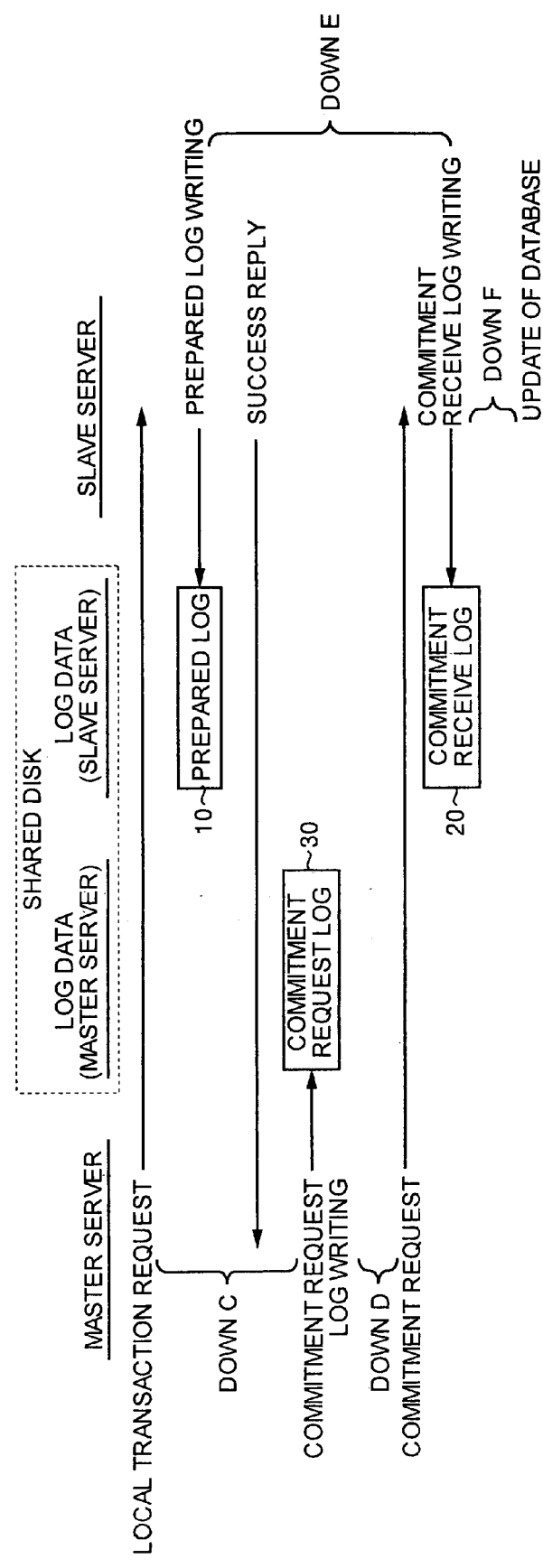

PREPARED LOG 10

COMMITMENT RECEIVING LOG 20

COMMITMENT REQUEST LOG 30

US 7,587,397 B2

DISTRIBUTED TRANSACTION PROCESSING CONTROL

This application is a continuing application, filed under 35 U.S.C. 111(a), of International Application PCT/JP02/13250, filed Dec. 18, 2002, incorporated by reference herein.

BACKGROUND OF THE INVENTION

1) Field of the Invention

The present invention relates to a distributed transaction processing system that can prevent blocking.

2) Description of the Related Art

In a distributed transaction processing, a two-phase commitment control is well known to ensure atomicity of a transaction (for example, see http://www.sei.cmu.edu/str/descriptions/dptc.html). In the two-phase commitment control, a master server (coordinator) sends a local transaction request to a plurality of slave servers (participants). Then the master server sends a commitment request to the slave servers only when receiving a success reply from all the slave servers. Otherwise, the master server sends an abort request to the slave servers. Thus, the databases in the slave servers are all updated or not updated at all, thereby ensuring the atomicity.

In the two-phase commitment control, however, the slave servers cannot determine processing to be subsequently performed after sending the reply, unless receiving the commitment request or the abort request from the master server. Therefore, when a fault occurs in the master server, the slave servers have to wait until the master server recovers from the fault, which is known as "blocking".

To avoid the blocking, a three-phase commitment control has been suggested (for example, see pages 41 to 50 of "Non Blocking Atomic Commitment with an Unreliable Failure Detector", by Rachild Gucrraoui, Mikel Larrea and Andre Schiper, in Proc. of the 14th Symposium on Reliable Distributed Systems, 1995, the Internet URL: http://ei.cs.vt.edu/~williams/OS/ThreePhase.html and the Internet URL: http://www.seas.gwu.edu/~shmuel/cs251/3PC.html). In the three-phase commitment control, even when a fault occurs in any one of the servers, the transaction processing is continued in other servers while ensuring the atomicity. However, overhead increases in the three-phase commitment control as compared to the two-phase commitment control.

SUMMARY OF THE INVENTION

It is an object of the present invention to at least solve the problems in the conventional technology.

A server according to an aspect of the present invention is a server in a distributed transaction processing system in which a master server performs a distributed transaction processing in cooperation with a slave server which performs a local transaction processing. The server includes: a log-data recording unit that records progress of any one of the distributed transaction processing and the local transaction processing as log data in a shared storage area that is accessible from both of the master server and the slave server; and a fault recovery unit that performs fault recovery based on the log data.

A processing method according to another aspect of the present invention is a processing method for a server in a distributed transaction processing system in which a master server performs a distributed transaction processing in cooperation with a slave server which performs a local transaction processing. The processing method includes: recording progress of any one of the distributed transaction processing and the local transaction processing as log data in a shared storage area that is accessible from both of the master server and the slave server; and performing fault recovery based on the log data.

A distributed transaction processing system according to still another aspect of the present invention includes: a slave server that performs a local transaction processing; a master server that performs a distributed transaction processing in cooperation with the local transaction processing; and a shared storage area that is accessible from both of the master server and the slave server. The master server and the slave server respectively include: a log-data recording unit that records progress of any one of the distributed transaction processing and the local transaction processing as log data in the shared storage area; and a fault recovery unit that performs fault recovery based on the log data.

A computer-readable recording medium according to still another aspect of the present invention stores a computer program for implementing the above method on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1A is a diagram for explaining a conventional two-phase commitment control;

FIG. 1B is a diagram for explaining a commitment control according to an embodiment of the present invention;

DETAILED DESCRIPTION

Figure 2:
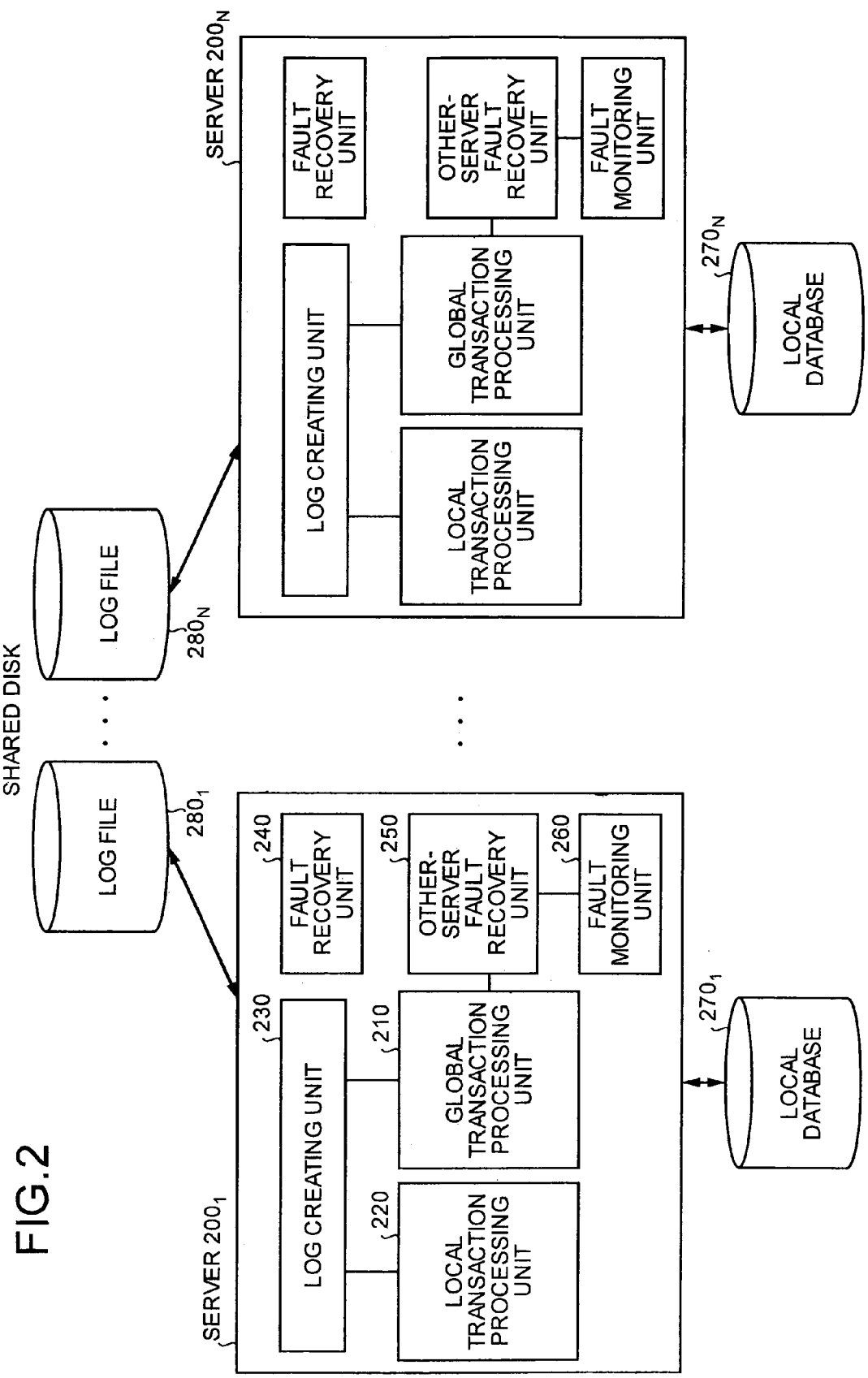
FIG. 2 is a block diagram of a configuration of a distributed transaction processing system according to the embodiment of the present invention.

Exemplary embodiments of the present invention are described below in detail with reference to the accompanying drawings.

FIG. 1A is a diagram for explaining a conventional two-phase commitment control performed by a conventional distributed transaction processing system, whereas FIG. 1B is a diagram for explaining a commitment control performed by a distributed transaction processing system according to an embodiment of the present invention. The distributed transaction processing systems shown in FIGS. 1A and 1B respectively include a plurality of slave servers, although only one of which is shown in the figures for convenience of description.

In the conventional two-phase commitment control shown in FIG. 1A, the master server sends the local transaction request to the slave servers. The slave servers respectively perform the local transaction processing and send a success reply or a failure reply to the master server without updating the databases. The master server sends a commitment request to the slave servers (in other words, gives instruction to update the databases) when receiving the success reply from all of the slave servers. On the other hand, the master server sends an abort request to the slave servers (in other words, gives instruction to abort the local transaction processing) when receiving the failure reply from any one of the slave servers.

If the master server crashes after sending the local transaction request to the slave servers (as shown "DOWN A" in FIG. 1A), the processing is blocked because the slave servers can receive neither the commitment request nor the abort request from the master server. On the other hand, if any one of the slave servers crashes after sending the success reply (as shown "DOWN B" in FIG. 1A), the databases cannot be updated even after the slave server recovers from the crash, because the information on the local transaction successfully performed before the crash has been lost.

In the commitment control according to the embodiment of the present invention shown in FIG. 1B, log data that indicates progress of the distributed transaction processing is stored in a shared disk. The shared disk is accessible from all the servers and has a plurality of storage areas, each of which is provided for each of the servers. The slave server writes a prepared log 10 into its own area on the shared disk before sending the success reply to the master server. The master server writes a commitment request log 30 into its own area before sending the commitment request to the slave servers, which respectively write a commitment receive log 20 into its own area before updating the database.

If the master server crashes after sending the local transaction request and before writing the commitment request log 30 (as shown "DOWN C" in FIG. 1B), the slave server aborts the processing because it cannot find the commitment request log 30 in the log data of the master server. If the master server crashes after writing the commitment request log 30 (as shown "DOWN D" in FIG. 1B), the slave server performs commitment process because the commitment request log 30 is included in the log data of the master server.

On the other hand, if the slave server crashes after writing the prepared log 10 and before writing the commitment receive log 20 (as shown "DOWN E" in FIG. 1B), after recovery from the crash, the slave server reads out the log data of the master server. If the commitment request log 30 is included in the log data, the slave server continues the local transaction processing that has been interrupted. If the commitment request log 30 is not included in the log data, the abort process is performed.

If the slave server crashes after writing the commitment receive log 20 and before updating the database (as shown "DOWN F" in FIG. 1B), after recovery from the crash, the slave server reads out the log data of the slave server and performs the commitment process if the commitment receive log 20 is included in the log data.

Thus, according to the embodiment of the present invention, even when a fault occurs in the master server, the slave servers can determine the processing to be subsequently performed by referring to the log data of the master server, thereby preventing the blocking.

Moreover, even when a fault occurs in the slave server, the slave server that has recovered from the fault can continue the local transaction processing interrupted by the fault by referring to the log data of the master server or the slave server.

FIG. 2 is a detailed block diagram of a configuration of the distributed transaction processing system according to the embodiment of the present invention. The distributed transaction processing system includes N servers $200_1$ to $200_N$, N local databases $270_1$ to $270_N$, and N log files $280_1$ to $280_N$.

The servers $200_1$ to $200_N$ are connected via a network. Each of the servers $200_1$ to $200_N$ can function as both the master server and the slave server. However, another configuration is possible in which, for example, some of the servers $200_1$ to $200_N$ only function as master server whereas others only function as slave server.

The local databases $270_1$ to $270_N$ are connected to the servers $200_1$ to $200_N$ respectively, and store data that is updated in the distributed transaction processing.

The log files $280_1$ to $280_N$ are created on the shared disk, and store log data of the servers $200_1$ to $200_N$ respectively. Each of the servers $200_1$ to $200_N$ can access not only to its own log data but also to log data of other servers. The log files $280_1$ to $280_N$ can be created on a nonvolatile memory or the like as long as it is accessible from all the servers.

Even when a fault occurs in some of the servers $200_1$ to $200_N$, other servers can continue the processing by referring to log data on the shared disk, thereby preventing blocking. Moreover, the server in which the fault has occurred can continue the processing by referring to the log data after the recovery.

Since all the servers $200_1$ to $200_N$ have similar configuration, the configuration of the server $200_1$ is described below as an example.

The server $200_1$ includes a global transaction processing unit 210, a local transaction processing unit 220, a log creating unit 230, a fault recovery unit 240, an other-server fault recovery unit 250, and a fault monitoring unit 260.

The global transaction processing unit 210 causes the server $200_1$ to function as the master server which controls the transaction to be performed atomically. Concretely, the global transaction processing unit 210 receives a request from an application and sends a request to the local transaction processing unit 220 of the servers $200_1$ to $200_N$ (the global transaction processing unit 210 can send the request not only to the other servers $200_2$ to $200_N$ but also to the server $200_1$ itself). The request sent by the global transaction processing unit 210 includes the local transaction request for starting the local transaction, the commitment request for writing a result of the local transaction into the local database, and the abort request for aborting the local transaction.

Moreover, the global transaction processing unit 210 writes the commitment request log 30, which indicates overall progress of the transaction processing, into the log file $280_1$.

The local transaction processing unit 220 causes the server $200_1$ to function as the slave server. Concretely, the local transaction processing unit 220 receives a local transaction request from the global transaction processing unit 210 of the servers $200_1$ to $200_N$ (the local transaction processing unit 220 can receive the request not only from the other servers $200_2$ to $200_N$ but also from the local transaction processing unit 220 of the server $200_1$ itself). Then the local transaction processing unit 220 performs the local transaction and writes the result of the processing into the local database $270_1$.

Moreover, the local transaction processing unit 220 writes the prepared log 10 and the commitment receive log 20, which indicate progress of each of the local transaction processing, into the log file $280_1$.

Thus, in the log file $280_1$, the overall progress of the transaction processing (concretely, the commitment request log 30) is recorded by the global transaction processing unit 210 and the progress of the local transaction processing (concretely, the prepared log 10 and the commitment receive log 20) is recorded by the local transaction processing unit 220. Even when a fault occurs in the server $200_1$, other servers $200_2$ to $200_N$ can continue the processing by referring to the log file $280_1$, thereby preventing blocking. The server $200_1$ itself can also continue the processing by referring to the log file $280_1$ after recovery from the fault.

The log creating unit 230 receives a request from the global transaction processing unit 210 or the local transaction processing unit 220, and writes log data into the log file $280_1$.

The fault recovery unit 240, after the server $200_1$ recovers from the fault, refers to the log files $280_1$ to $280_N$ and continues the local transaction processing that has been interrupted by the fault to recover the consistency of the local database.

The other-server fault recovery unit 250 performs fault recovery when a fault occurs in other servers $200_2$ to $200_N$. That is, if the fault occurs in the master server after sending the local transaction request, the other-server fault recovery unit 250 commits or aborts the local transaction started by the request. If the fault occurs in other slave servers, the other-server fault recovery unit 250 aborts the local transaction.

The fault monitoring units 260 of the servers $200_1$ to $200_N$ mutually monitor status of the servers $200_1$ to $200_N$ by, for example, exchanging an "I am alive" message. When detecting a fault in any one of other servers, the fault monitoring unit 260 starts the other-server fault recovery unit 250 to perform the fault recovery.

Figure 3A:
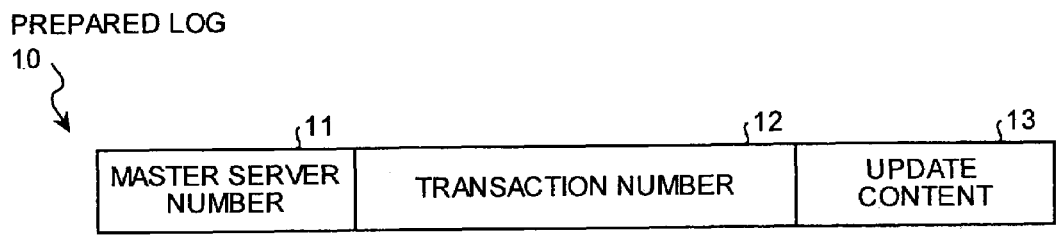
FIG. 3A is an example of data structure of a prepared log.
Figure 3B:
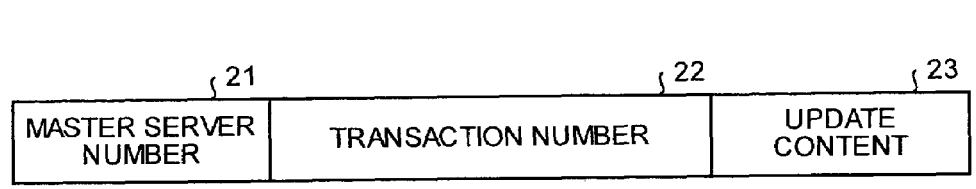
FIG. 3B is an example of data structure of a commitment receive log.
Figure 3C:
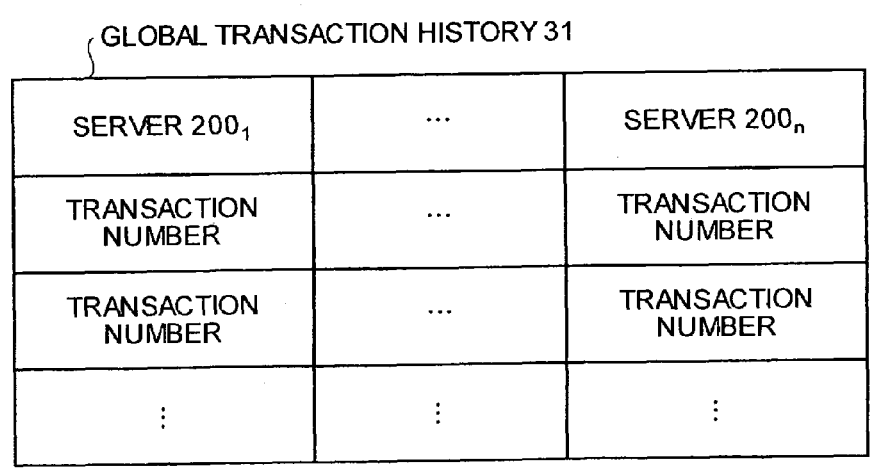
FIG. 3C is an example of data structure of a commitment request log.

FIG. 3A is an example of data structure of the prepared log 10. FIG. 3B is an example of data structure of the commitment receive log 20. FIG. 3C is an example of data structure of the commitment request log 30.

As shown in FIG. 3A, the prepared log 10 includes a master server number 11 which is an ID number of the master server, a transaction number 12 which is an ID number of a transaction processing, and an update content 13 that indicates data to be written into the local database. Here, the update content 13 designates data after the local transaction processing.

As shown in FIG. 3B, the commitment receive log 20 similarly includes a master server number 21 which is the ID number of the master server, a transaction number 22 which is the ID number of a transaction, and an update content 23 that indicates data to be written into the local database. Here, the update content 23 designates data after the local transaction processing.

As shown in FIG. 3C, the commitment request log 30 is a global transaction history 31 in which the transaction number of a transaction to be committed is registered for each of the servers. In other words, the global transaction history 31 stores, for each of the servers, the transaction number of the transaction to be committed. The global transaction history 31 is located at the head of the log file.

Figure 4:
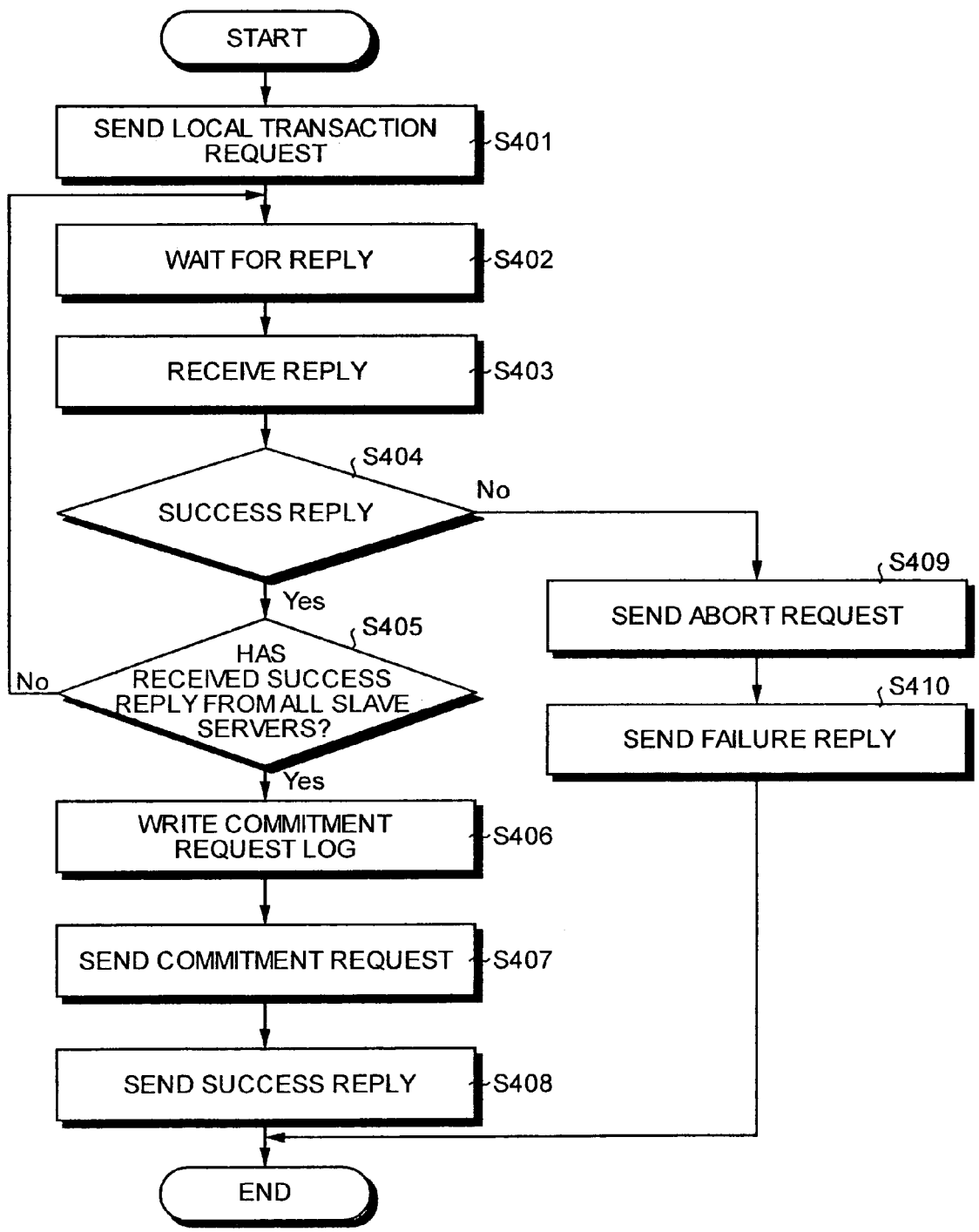
FIG. 4 is a flow chart of the processing procedure performed by a global transaction processing unit shown in FIG. 2.

FIG. 4 is a flow chart of the processing procedure performed by the global transaction processing unit 210.

When receiving a request from the application, the global transaction processing unit 210 sends a local transaction request to the slave servers (step S401), and waits for a reply from the slave servers (step S402). When receiving the reply from any of the slave servers (step S403), the global transaction processing unit 210 checks whether the reply is the success reply or not (step S404). If the reply is the success reply (step S404: Yes), the global transaction processing unit 210 checks whether the success reply has been received from all the slave servers (step S405).

If the success reply is received from all the slave servers (step S405: Yes), the global transaction processing unit 210 causes the log creating unit 230 to write the commitment request log 30 into the log file $280_1$ (step S406). Then, the global transaction processing unit 210 sends the commitment request to the slave servers (step S407), and responds success of the transaction to the application (step S408).

On the other hand, if the success reply is not yet received from all the servers (step S405: No), the global transaction processing unit 210 waits for a reply from other slave servers (step S402). If the reply received from the server is not the success reply (step S404: No), the global transaction processing unit 210 sends the abort request to the slave servers (step S409), and responds failure of the transaction to the application (step S410).

Thus, the global transaction processing unit 210 writes the commitment request log 30 into the log file $280_1$ before sending the commitment request to the slave servers. When the master server receives a response to the commitment request from the slave server, corresponding commitment request log 30 stored in the corresponding server as a part of global transaction history of the master server may be discarded.

Figure 5:
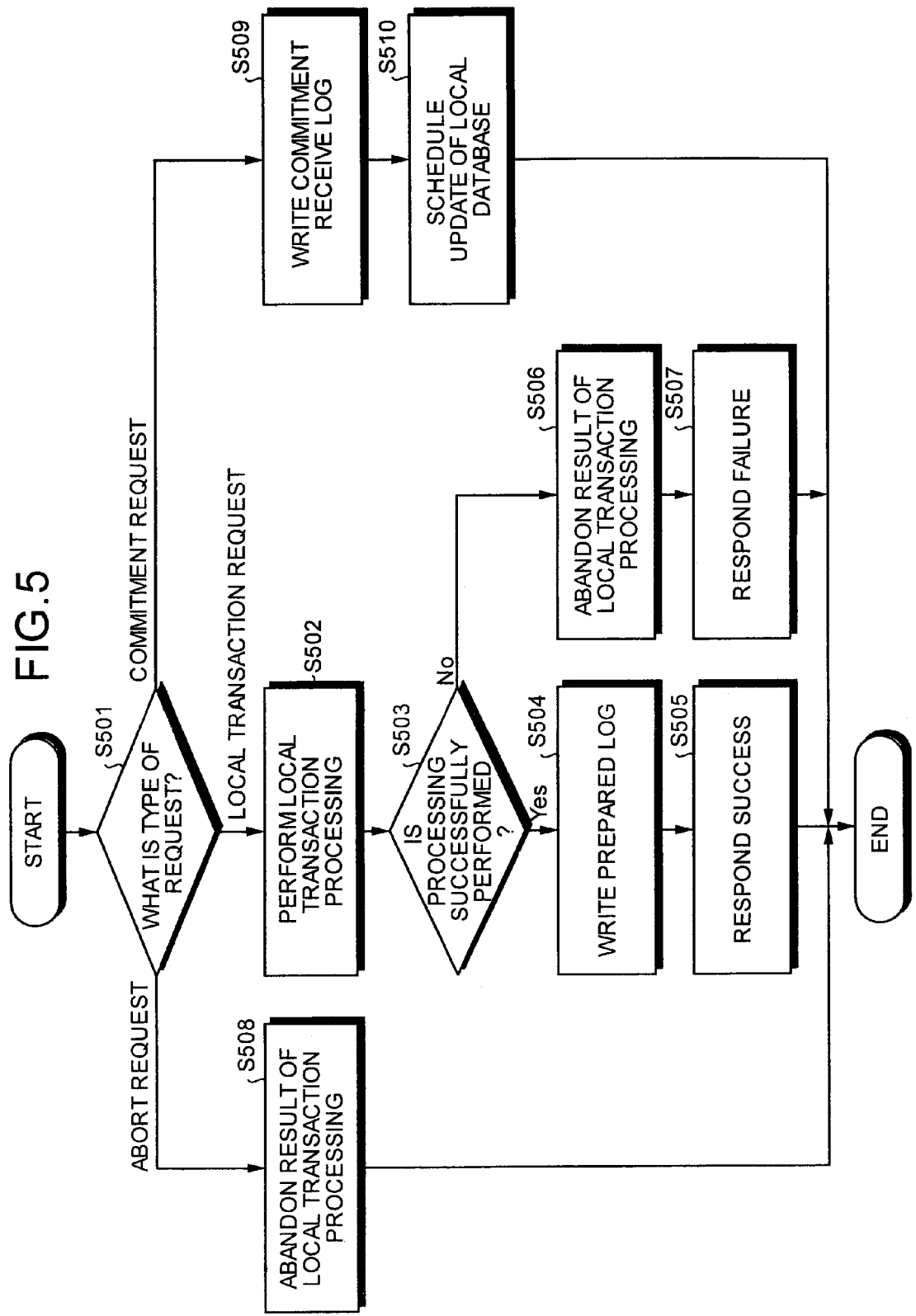
FIG. 5 is a flow chart of the processing procedure performed by a local transaction processing unit shown in FIG. 2.

FIG. 5 is a flow chart of the processing procedure performed by the local transaction processing unit 220.

The local transaction processing unit 220 checks a type of a request that is received from the global transaction processing unit 210 (step S501). If the request is the local transaction request, the local transaction processing unit 220 performs the local transaction processing (step S502) and determines whether the processing is successfully performed (step S503).

If the processing is successfully performed (step S503: Yes), the local transaction processing unit 220 causes the log creating unit 230 to write the prepared log 10 in the log file $280_1$ (step S504), and sends the success reply to the global transaction processing unit 210 which has sent the local transaction request (step S505). On the other hand, if the local transaction processing is not successfully performed (step S503: No), the local transaction processing unit 220 abandons a result generated by the local transaction processing (step S506) and responds failure to the global transaction processing unit 210 which has sent the local transaction request (step S507).

When receiving the abort request, the local transaction processing unit 220 abandons the result generated by the local transaction processing (step S508). When receiving the commitment request, the local transaction processing unit 220 causes the log creating unit 230 to write the commitment receive log 20 in the log file $280_1$ (step S509) and schedule the update of the local database.

Thus, the local transaction processing unit 220 writes into the log file $280_1$ the prepared log 10 when the local transaction processing is successfully performed, and the commitment receive log 20 when receiving the commitment request. The prepared log 10 and the commitment receive log 20 are deleted by the local transaction processing unit 220 when the local database $270_1$ is successfully updated.

Figure 6:
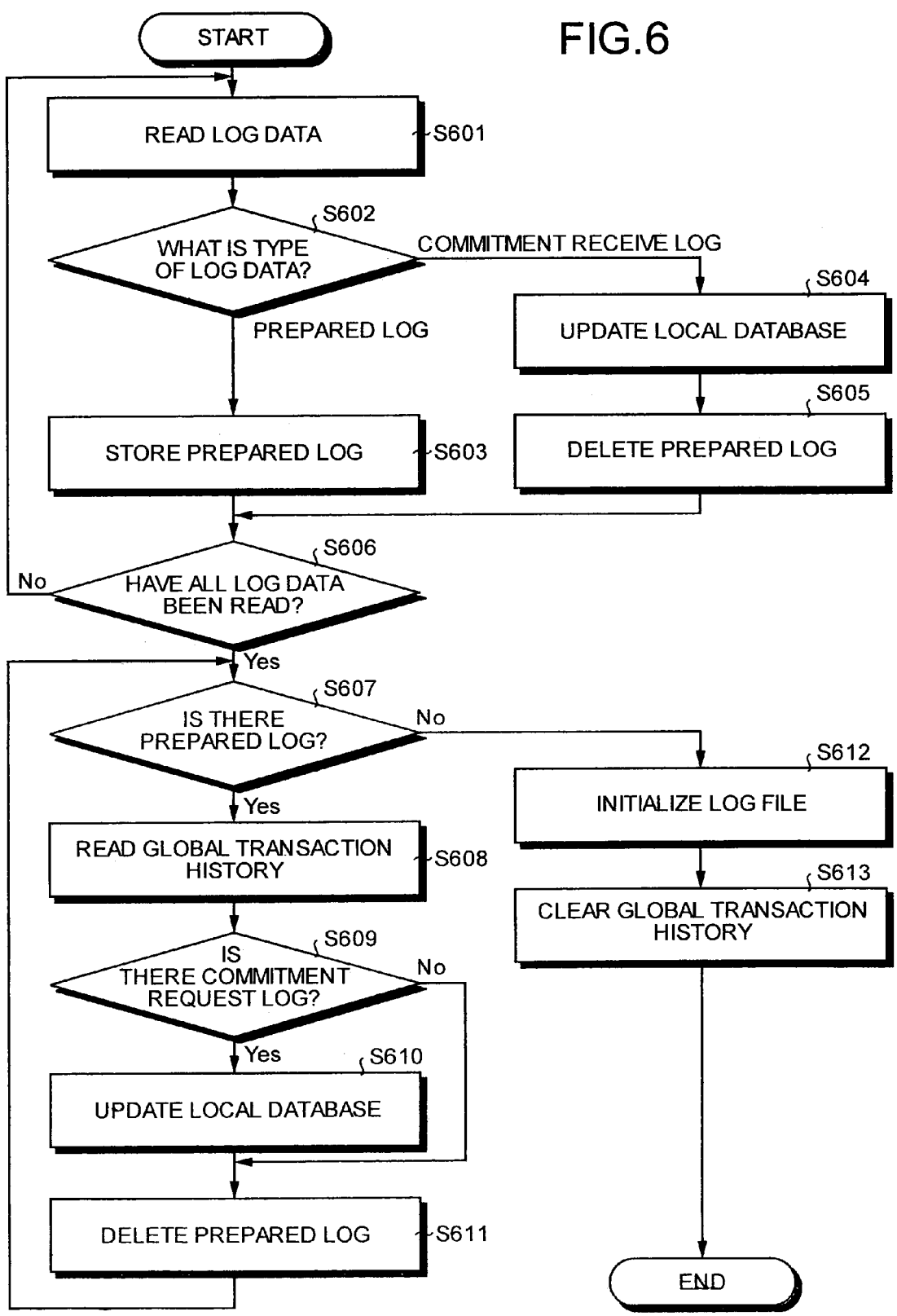
FIG. 6 is a flow chart of the processing procedure performed by a fault recovery unit shown in FIG. 2.

FIG. 6 is a flow chart of the processing procedure performed by the fault recovery unit 240.

The fault recovery unit 240 reads out log data from the log file $280_1$ when the server $200_1$ recovers from a fault (step S601), and checks a type of the log data (step S602). If the log data is the prepared log 10, the fault recovery unit 240 stores the prepared log 10 in a memory (step S603). If the log data is the commitment receive log 20, the fault recovery unit 240 updates the local database $270_1$ (step S604) and deletes the corresponding prepared log 10 from the memory (step S605).

Then, the fault recovery unit 240 checks whether all the log data in the log file $280_1$ has been read or not (step S606). If all the log data have not been read (step S606: No), the fault recovery unit 240 reads the next log data (step S601).

If all the log data in the log file $280_1$ have been read, the fault recovery unit 240 checks if there is the prepared log 10 left in the memory (step S607). If there is the prepared log 10 left in the memory (step S607: Yes), which means that the commitment request has not been received for the local transaction processing corresponding to the prepared log 10, the fault recovery unit 240 reads the global transaction history 31 of the master server (i.e. a server that is identified by the master server number 11 in the prepared log 10) (step S608). Then the fault recovery unit 240 checks whether the global transaction history 31 corresponding to the server $200_1$ includes the commitment request log 30 corresponding to the prepared log 10 (step S609). That is, the fault recovery unit 240 checks whether the commitment request log 30 includes a transaction number that coincides with the transaction number 12 in the prepared log 10.

If the commitment request log 30 corresponding to the prepared log 10 is included, which means the fault occurred after the master device had sent the commitment request, the fault recovery unit 240 updates the local database $270_1$ (step S610) and deletes the prepared log 10 (step S611). Then, the process returns to step S607 and the fault recovery unit 240 performs the same processing for the next prepared log 10. On the other hand, if the commitment request log 30 corresponding to the prepared log 10 is not included, which means that the master server has not sent the commitment request, the fault recovery unit 240 deletes the prepared log 10 without updating the local database $270_1$ (step S611). Then, the process returns to step S607 and the fault recovery unit 240 performs the same processing for the next prepared log 10.

If there is no prepared log 10 left in the memory (step S607: No), the fault recovery unit 240 initializes the log file $280_1$ (step S612) and clears the commitment request log 30 corresponding to the server $200_1$ from the global transaction history 31 (step S613).

Thus, the fault recovery unit 240 continues the local transaction processing that has been interrupted by the fault by referring to the log files $280_1$ to $280_N$. This enables to ensure the consistency of the local database $270_1$ even if a fault occurs in the server $200_1$ during the local transaction processing.

Figure 7:
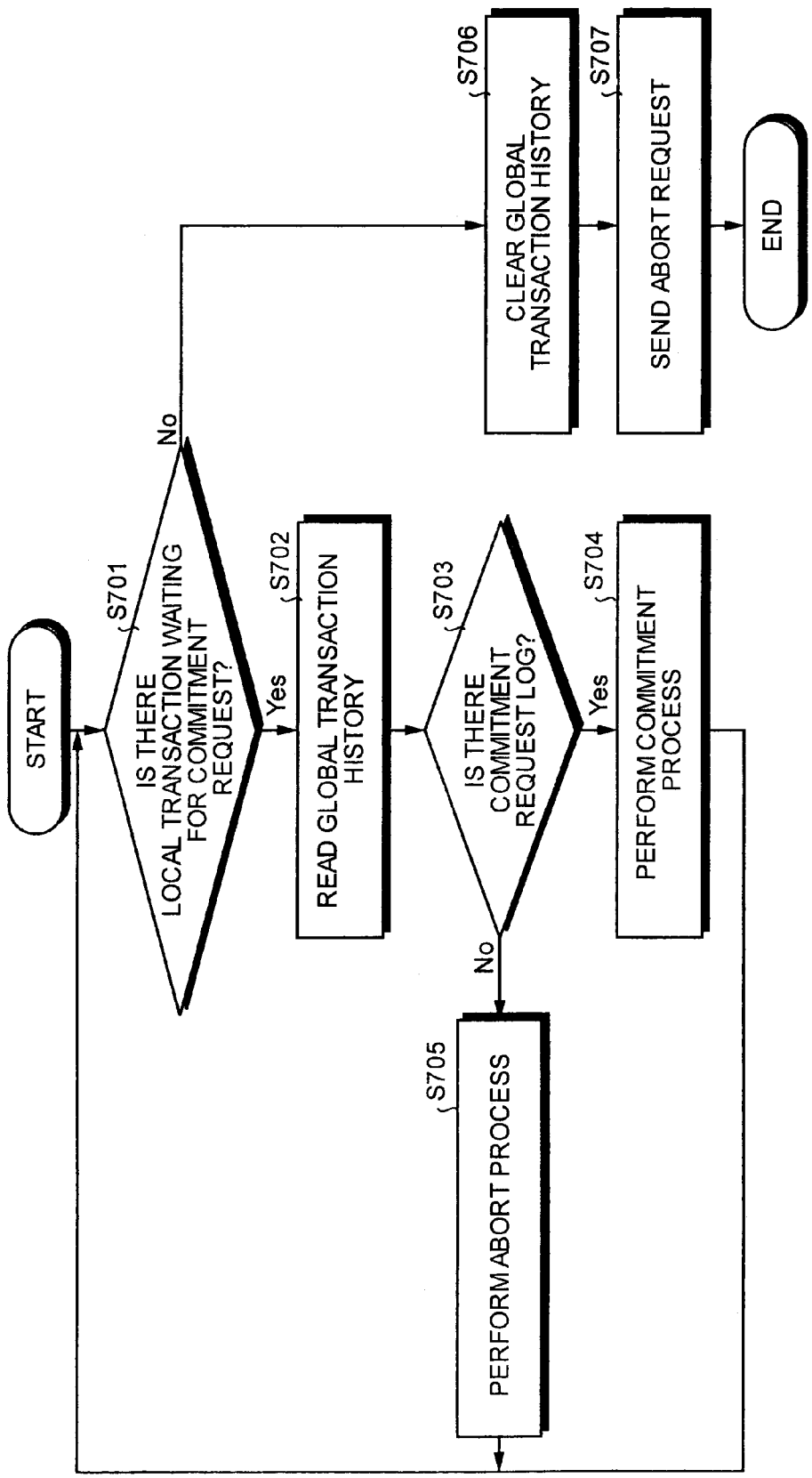
FIG. 7 is a flow chart of the processing procedure performed by an other-server fault recovery unit shown in FIG. 2.

FIG. 7 is a flow chart of the processing procedure performed by the other-server fault recovery unit 250. The other-server fault recovery unit 250 is started when the fault monitoring unit 260 detects a fault in other servers.

As shown in FIG. 7, the other-server fault recovery unit 250 checks if there is a local transaction processing waiting for the commitment request from the faulty server (step S701). If there is such a local transaction processing, the other-server fault recovery unit 250 reads out the commitment request log 30 for the server $200_1$ from the global transaction history 31 of the faulty server (step S702), and checks if there is the commitment request log 30 corresponding to the local transaction processing (step S703). If there is the corresponding commitment request log 30 in the global transaction history corresponding to the server $200_1$ (step S703: Yes), the other-server fault recovery unit 250 performs the commitment process (step S704). If there is no commitment request log 30 (step S703: No), the other-server fault recovery unit 250 performs the abort process (step S705). Then, the process returns to step S701 and the other-server fault recovery unit 250 performs the same processing for the next local transaction processing.

On the other hand, if there is no local transaction processing of which the faulty server functions as the master server (step S701: No), the other-server fault recovery unit 250 clears the commitment request log 30 for the server $200_1$ from the global transaction history 31 of the faulty server (step S706). Furthermore, the other-server fault recovery unit 250 sends the abort request for the local transaction processing, of which the own server functions as the master server and the faulty server functions as one of the slave servers (step S707).

Thus, when a fault occurs in the master server, the other-server fault recovery units 250 of slave servers commit or abort the local transaction processing based on the commitment request log 30 included in the global transaction history 31. On the other hand, when a fault occurs in any one of the slave servers, the other-server fault recovery unit 250 of the master server sends the abort request to all the slave servers. This enables to prevent unnecessary waiting for recovery of the faulty server.

Thus, according to the embodiment of the present invention, the log files $280_1$ to $280_N$ are created on the shared disk that is accessible from all the servers $200_1$ to $200_N$. The global transaction processing unit 210 and the local transaction processing unit 220 of each server records log data in the log files $280_1$ to $280_N$. When a fault occurs in other servers, the other-server fault recovery unit 250 performs the fault recovery of a transaction in which the faulty server is involved by referring to the log data in the log files $280_1$ to $280_N$. This enables to prevent the blocking as well as to ensure the atomicity of the transaction.

Moreover, the fault recovery unit 240 of the faulty server continues local transaction processing that is interrupted by the fault by referring to the log data in the log files $280_1$ to $280_N$ after recovery from the fault. This enables to ensure the atomicity of the transaction and to recover the consistency of the database.

Figure 8:
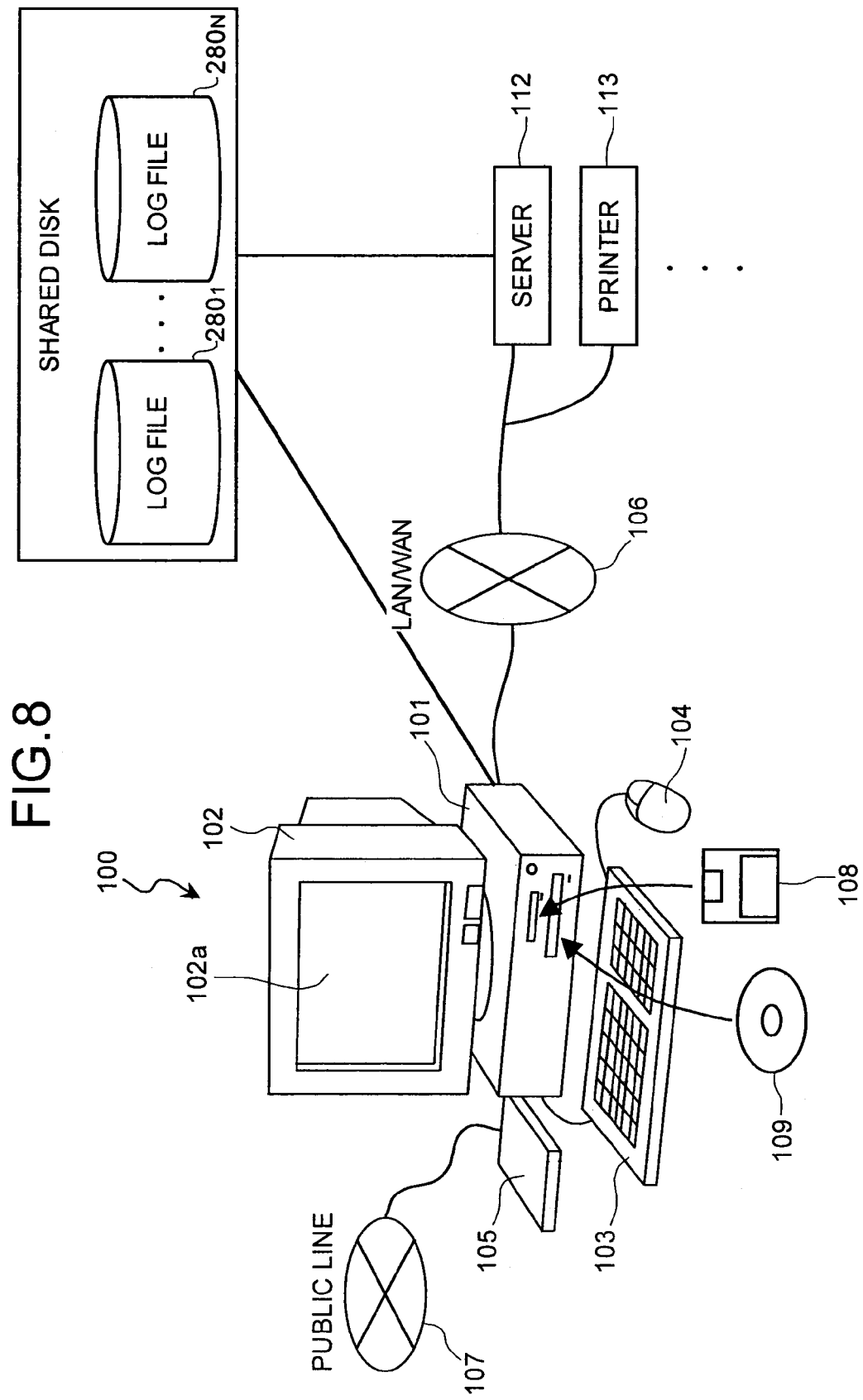
FIG. 8 is a diagram of a computer system that executes a distributed transaction processing program according to the embodiment of the present invention.

The servers $200_1$ to $200_N$ can be realized by a program that performs the processing described above. FIG. 8 is a diagram of the computer system that executes the program. As shown in FIG. 8, a computer system 100 includes a main body 101, a display 102, a key board 103, a mouse 104, a LAN interface, and a modem 105. The display 102 displays information (such as an image) on a display screen 102a. The key board 103 inputs information in the computer system 100. The mouse 104 designates a position on the display screen 102a of the display 102. The LAN interface connects to a LAN/WAN 106. The modem 105 connects to a public line 107 such as the Internet. In this case, the LAN/WAN 106 connects a personal computer (PC) 111, a server 112, and a printer 113 to the computer system 100.

Figure 9:
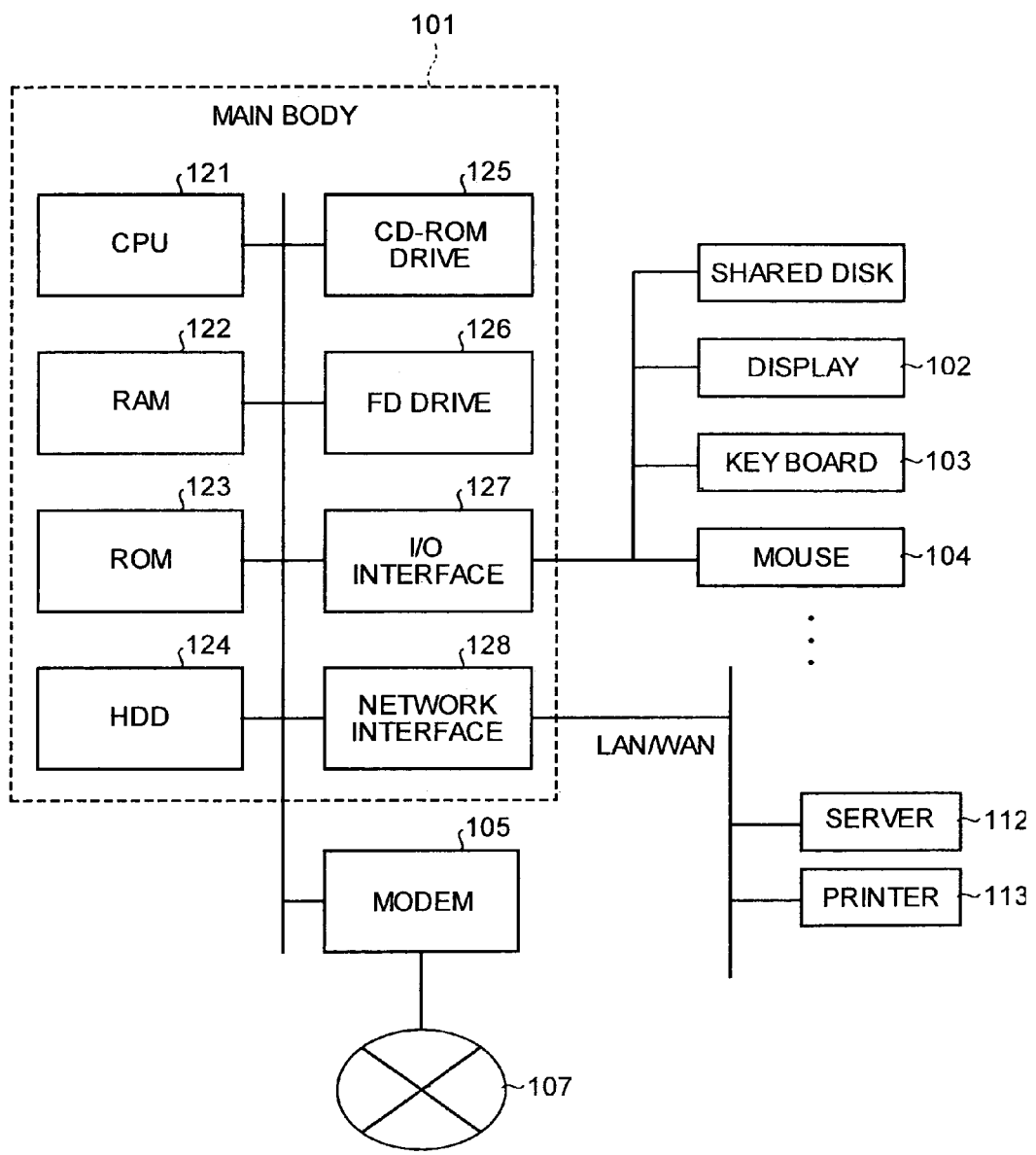
FIG. 9 is a functional block diagram of a configuration of a main body shown in FIG. 8.

FIG. 9 is a functional block diagram of a configuration of the main body 101. The main body 101 includes a central processing unit (CPU) 121, a random access memory (RAM) 122, a read only memory (ROM) 123, a hard disc drive (HDD) 124, a compact disc-read only memory (CD-ROM) drive 125, a flexible disc (FD) drive 126, an I/O interface 127, and a network interface 128.

The program is stored in a portable recording medium such as an FD 108, a CD-ROM 109, a digital versatile disc (DVD), a magnetic disc, and an integrated circuit (IC) card. The program can be stored in a database of the PC 111 or the server 112 that are connected via the network interface 128, or a database of other computer system that is connected via the public line 107. The program that is installed in the computer system 100 is stored in the HDD 124, and executed by the CPU 121 by using the RAM 122 and the ROM 123.

Thus, according to the embodiment of the present invention, the fault recovery is performed based on the log data stored in the shared disk accessible from all the servers, thereby preventing the blocking with little overheads as well as recovering the consistency of the database immediately after the recovery from the fault.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A server computer in a distributed transaction processing system in which a master server computer performs a distributed transaction processing in cooperation with a plurality of slave server computers that perform a local transaction processing, the server computer having both a function of the master server computer and a function of the slave server computer, comprising:
    a log-data recording unit that records progress of any one of the distributed transaction processing and the local transaction processing as log data in a shared disk accessible from both the master server computer and the slave server computers, the log-data recording unit including
        a first log-data recording unit that records progress of the distributed transaction processing once the server computer is functioning as the master server computer; and
        a second log-data recording unit that records progress of the local transaction processing once the server computer is functioning as the slave server computer; and
    a fault recovery unit that performs a fault recovery based on the log data, wherein
    the progress of the distributed transaction processing is represented by a commitment request log, and the progress of the local transaction processing is represented by a prepared log and a commitment receive log, wherein
    upon successfully performing the local transaction processing, the server computer functioning as the slave server computer records the prepared log,
    upon receiving success replies from all of the server computers functioning as the slave server computers, the server computer functioning as the master server computer records the commitment request log before sending a commitment request to the all of the server computers functioning as the slave server computers, and
    upon receiving the commitment request, the server computer functioning as the slave server computer records the commitment receive log.

2. The server computer according to claim 1, wherein
    the commitment request log includes a transaction number for uniquely identifying a distributed transaction processing and a slave server computer number for uniquely identifying the slave server computer, and
    the prepared log and the commitment receive log respectively include the transaction number, the master server computer number, and a result of the local transaction processing.

3. The server computer according to claim 1, wherein
    once the server computer functions as the slave server computer and a fault occurs in the master server computer, the fault recovery unit commits the local transaction processing once the commitment request log has been recorded by the master server computer and aborts the local transaction processing otherwise, and
    once the server computer functions as the master server computer and a fault occurs in the slave server computer, the fault recovery unit aborts the distributed transaction processing.

4. The server computer according to claim 1, wherein once the server computer functions as the slave server computer, the fault recovery unit commits the local transaction processing, of which the prepared log has been recorded by the server computer, upon the commitment request log having been recorded by the master server computer, and aborts the local transaction processing otherwise.

5. A computer-readable recording medium that stores a computer program for a server computer in a distributed transaction processing system in which a master server computer performs a distributed transaction processing in cooperation with a plurality of slave server computers that perform a local transaction processing, wherein the computer program causes the server computer having both a function of the master server computer and a function of a slave server computer to execute;
    recording progress of any one of the distributed transaction processing, once the server computer functions as the master server computer; and recording progress of the local transaction processing, once the server computer functions as the slave server computer, as log data in a shared disk that is accessible from both the master server computer and the slave server computers; and
    performing a fault recovery based on the log data, wherein
    the progress of the distributed transaction processing is represented by a commitment request log, and the progress of the local transaction processing is represented by a prepared log and a commitment receive log, wherein
    upon successfully performing the local transaction processing, the server computer functioning as the slave server computer records the prepared log,
    upon receiving success replies from all of the server computers functioning as the slave server computers, the server computer functioning as the master server computer records the commitment request log before sending a commitment request to the all of the server computers functioning as the slave server computers, and
    upon receiving the commitment request, the server computer functioning as the slave server computer records the commitment receive log.

6. The computer-readable recording medium according to claim 5, wherein
    the commitment request log includes a transaction number for uniquely identifying a distributed transaction processing and a slave server computer number for uniquely identifying the slave server computer, and
    the prepared log and the commitment receive log respectively include the transaction number, the master server computer number, and a result of the local transaction processing.

7. The computer-readable recording medium according to claim 5, wherein
    once the server computer functions as the slave server computer and a fault occurs in the master server computer, the performing includes,
    committing the local transaction processing upon the commitment request log having been recorded by the master server computer, and
    aborting the local transaction processing otherwise, and
    once the server computer functions as the master server computer and a fault occurs in the slave server computer, the performing includes aborting the distributed transaction processing.

8. The computer-readable recording medium according to claim 5, wherein once the server computer functions as the slave server computer, the performing includes, committing the local transaction processing, of which the prepared log has been recorded by the server computer, upon the commitment request log having been recorded by the master server computer, and aborting the local transaction processing otherwise.

9. A processing method for a server computer in a distributed transaction processing system in which a master server computer performs a distributed transaction processing in cooperation with a plurality of slave server computers that perform a local transaction processing, the server computer having both a function of the master server computer and a function of a slave server computer, comprising:

recording progress of any one of the distributed transaction processing, once the server computer functions as the master server computer, and recording progress of the local transaction processing, once the server computer functions as the slave server computer, as log data in a shared disk that is accessible from both the master server computer and the slave server computers; and performing a fault recovery based on the log data, wherein the progress of the distributed transaction processing is represented by a commitment request log, and the progress of the local transaction processing is represented by a prepared log and a commitment receive log, wherein upon successfully performing the local transaction processing, the server computer functioning as the slave server computer records the prepared log, upon receiving success replies from all of the server computers functioning as the slave server computers, the server computer functioning as the master server computer records the commitment request log before sending a commitment request to the all of the server computers functioning as the slave server computers, and upon receiving the commitment request, the server computer functioning as the slave server computer records the commitment receive log.

10. The processing method according to claim 9, wherein the commitment request log includes a transaction number for uniquely identifying a distributed transaction processing and a slave server computer number for uniquely identifying the slave server computer, and the prepared log and the commitment receive log respectively include the transaction number, the master server computer number, and a result of the local transaction processing.

* * * * *